Nov. 30, 1943.    R. W. ADAMS    2,335,722
CEMENTITIOUS PRODUCT
Filed March 13, 1941
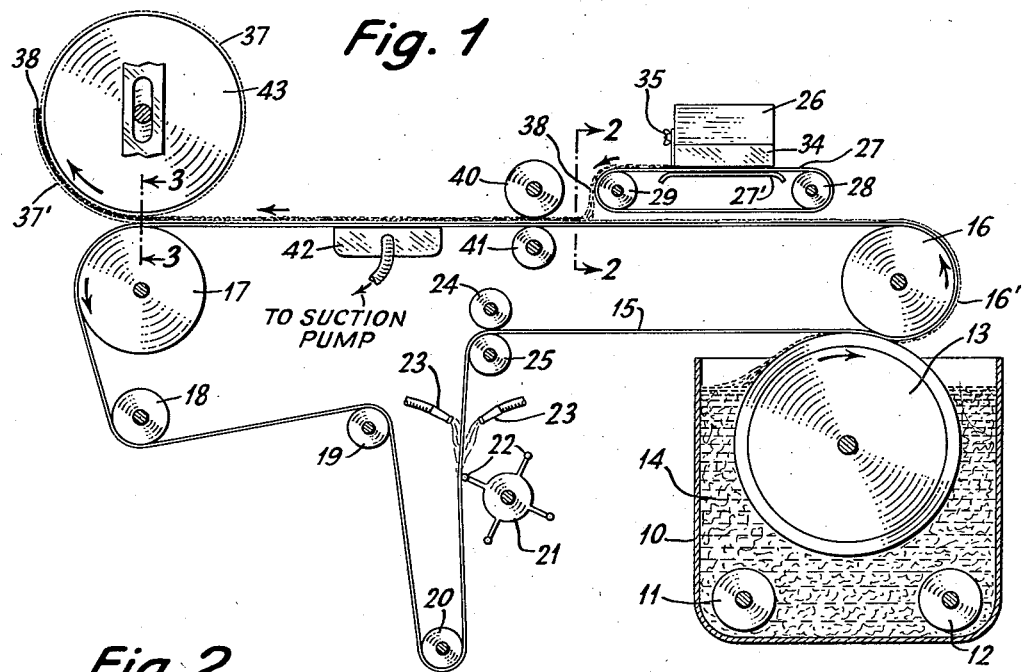
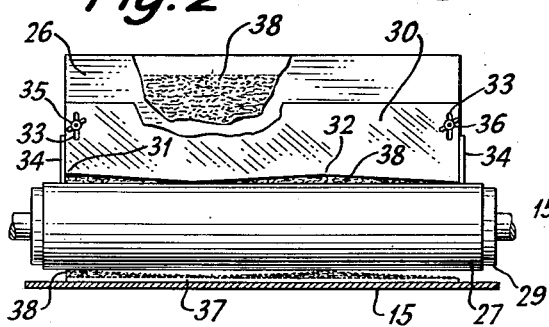
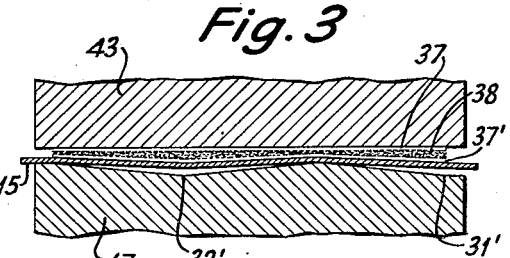
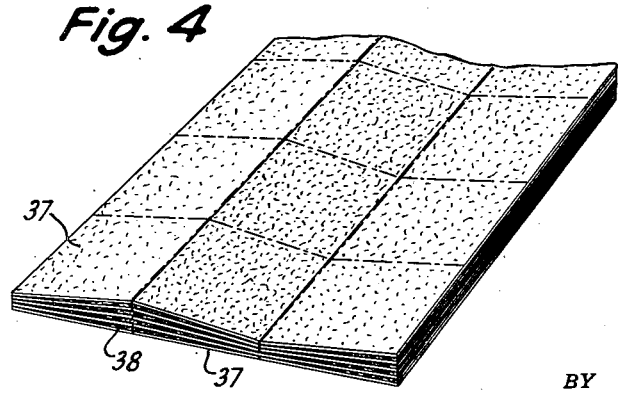
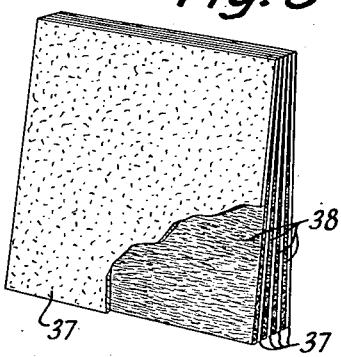
INVENTOR.
RAYMOND W. ADAMS
BY William A. Zalesak
ATTORNEY.

Patented Nov. 30, 1943

2,335,722

UNITED STATES PATENT OFFICE 2,335,722

CEMENTITIOUS PRODUCT

Raymond W. Adams, Bound Brook, N. J.

Application March 13, 1941, Serial No. 383,138

5 Claims. (Cl. 154—45.9)

My invention relates to products of cementitious material, particularly to built-up laminated asbestos-cement slabs, for example shingles for use in building, and to the method and apparatus for producing the same.

Briefly the method presently used for manufacturing such products is to provide a tank or cylinder vat in which is placed a mixture of cement and asbestos fibers thoroughly mixed and hydrated. The mixing may be for a period of from one to three hours. Rotatably mounted in the tank is a so-called sieve cylinder rotating within the cylinder vat or tank in which the mixture to be fabricated is stored, this mixture being continuously agitated. The sieve cylinder is hollow and the mixture is forced against the sieve by pressure of the mixture in the vat and adheres to the surface of the cylinder. A travelling machine belt of felt is in contact with the upper surface of the sieve cylinder which extends above the surface of the mixture to be formed into slabs. The felt belt picks up this mixture as a layer from the sieve cylinder and then carries it to an accumulator roll to which the layer adheres and upon which the formed layer is wound to the proper number of thicknesses or laminations after which the laminated product is stripped from the accumulator roll and cut to the desired size.

In this conventional process for making laminated slabs a product of high tensile strength and modulus rupture is provided. However, the result is obtained only by use of very costly long asbestos fiber. The asbestos fiber takes the place of reinforcing material, such as steel rods in reinforced concrete. It is essential that long costly fiber be used for the reasons pointed out below.

The process universally used for building up laminated asbestos-cement slabs is closely related to the millboard and paper making processes, all of which require large quantities of water in the circulating system, sometimes reaching the amount of 10,000 to 20,000 gallons. Before the material is actually formed into the plastic product in the laminating machine a mixture composed of cement and long asbestos fiber is passed through several different stages of mixing for a period of from one to three hours. During this mixing period the cement and long asbestos fiber are constantly in contact with water, resulting in over-hydration and final setting of a large part of the finely ground cement before the material is formed into a plastic sheet. The fine particles are of micron size and are essential for the ultimate strength and hardness which any product which uses cement as a hydraulic binder requires. The hydration and setting time of the micron size particles of cement is of short duration and unless the time required to form the finished product is shorter than the duration of hydration and setting time, it is difficult to obtain any binding value from the finely ground cement. In other words, the over-hydrated cement particles which cause final setting have no high binding value and may be considered merely as a filler. An effort is made to overcome this over-hydration by the use of long costly fibers to overcome the deficiency of the binding property of the cement which would otherwise result in a weak product. In the process the fibers are automatically arranged lengthwise of the slab by the sieve cylinder, thus increasing the reinforcing value of the fibers.

Hence it is one of the objects of my invention to make a built-up laminated asbestos-cement product having improved characteristics in which over-hydration to a great degree is corrected and which can utilize to a great extent shorter fibers throughout the product and still obtain the strength of the long fiber product.

In the past in making laminated material for the purpose of using the material, for example as shingles, it was essential to form one end of the shingle so as to be of a greater thickness than the other. To do this on conventional apparatus required that the sieve cylinder have a portion of its surface blocked off so as to not pick up material, thus reducing the effective output of the apparatus. Again with a conventional apparatus there was no way of making a finished corrugated product without so deforming the product in its final stages as to place portions of the product under stress almost to the extent of tearing in order to provide the variation in curvature of the corrugations to permit overlapping during building.

It is, therefore, another object of my invention to provide a method and apparatus for producing laminated slabs of varying thickness while at the same time utilizing the entire surface of the sieve cylinder and thus increasing the output by making the process of manufacture a continuous process employing the entire surface of the sieve cylinder.

It has also been attempted in the past to make asbestos-cement products with a waterproof characteristic by incorporating the waterproofing agents in the mixture. Attempts so far have not met with great success since in applying the waterproofing material in the conventional manner in the cylinder vat the amount of water was so great as to cause dilution of the waterproofing compound to the point where effective waterproofing had very little noticeable effect in the finished product. Attempts to use waterproofing agents such as calcium and aluminum, stearate, metasap, tallow and many other products are too expensive to permit commercial use throughout the entire slab. In addition these agents have a very unfavorable reaction by retarding and stopping the setting of the cement.

It is a further object of my invention to provide a method and apparatus for manufacturing a waterproofed laminated asbestos-cement product which is effectively waterproofed and to produce a laminated asbestos-cement product having effective waterproofing characteristics.

It is also sometimes desirable to provide a laminated asbestos-cement product which is not subject to fungus growth as sometimes occurs in the warmer climates. No ready means has in the past been available for accomplishing this purpose.

It is, therefore, a still further object of my invention to provide a laminated asbestos-cement product having a fungus-proof characteristic and a method and means for manufacturing such a product.

The novel features which I believe to be characteristic of my invention are set forth with particularity in the appended claims, but the invention itself will best be understood by reference to the following description taken in connection with the accompanying drawing in which Figure 1 is a diagrammatic representation with parts shown in detail of an apparatus for making a laminated asbestos-cement product in accordance with my invention, Figure 2 is a section taken along the line 2—2 of Figure 1 showing details of construction of part of the apparatus made according to my invention, Figure 3 is an enlarged section taken along the line 3—3 of Figure 1 of parts of the apparatus to show the method of manufacturing the product made according to my invention, Figure 4 shows one step in the process of forming the finished product in accordance with my invention and before the sheet has been cut into the finished product as shown in Figure 5.

As shown in Figure 1 the cylinder vat 10 is provided with the agitators 11 and 12 for thoroughly mixing the material within the vat. A sieve cylinder or forming cylinder 13 is rotatably mounted to rotate within the vat to pick up the material 14 on its surface. The sieve cylinder in picking up the material automatically lays the long fibers longitudinally of the travel of the cylinder and the finished slab. In contact with the surface of the sieve cylinder is the machine felt or belt 15, which travels over a so-called couch or rubber covered roller 16 which forces the felt belt into contact with the sieve cylinder to pick up a layer of the material as indicated by the dotted surface 16'. This belt travels over a drive roller 17, the idling rolls 18, 19 and 20, past a web beater mechanism 21 in which are mounted a plurality of rods 22 which beat against the web as the web passes by. Mounted above the beater are shower devices 23 for cleaning the surface of the web. The web then passes between the squeeze rolls 24 and 25 to remove the moisture in the belt. After the material 14 is picked up on the belt 15 it passes under an apparatus for making a laminated product in accordance with my invention.

As best shown in Figures 1 and 2, I provide a hopper 26 in which dry material, such as cement, and short fibers are mixed together. The hopper is open at the bottom and cooperates with a travelling and distributing endless belt 27 supported on the rotating rollers 29 and 28, one of which may be driven. The belt may be slidably supported on the supporting plate 27'.

As best shown in Figure 2 the front end of the hopper is provided with a so-called form scraper 30, the bottom edge of which is formed to provide the desired thickness and contour of the dry material which is deposited on the endless belt 27 and then deposited on the layer picked up by the web belt 15 from the sieve cylinder as the layer passes under the hopper arrangement. Thus at the points marked 31 and 32 the greatest depth of dry material 38 is deposited on the layer on the web belt 15 as it passes beneath the hopper arrangement. The form scraper 30 is provided with slots 33 which permit adjustment of the scraper in a vertical direction to regulate the thickness of the coating 38 applied to the wet layer. Two screws 35 and 36 lock the scraper in place at the desired elevation, the scraper sliding between the side guides 34 of the hopper.

A pair of smoothing rolls 40 and 41 may be used to help roll and flatten the short fibers in the dry material and to lay them longitudinally of the material, the upper roll 40 being corrugated to have a transverse section in which the corrugations are substantially equivalent to the form of the form scraper. The superimposed layers now bound together are then passed over a suction box 42 which removes any excess moisture from the material not required for the proper hydration of the dry layer. The only passage for the incoming air which enters the vacuum box is through the superimposed layers and the cotton warp felt belt. A vacuum of about 10 inches of mercury has been found satisfactory. This suction is sufficient to pull asbestos fibers which are part of the dry layer into the wet layer deposited underneath and in this manner makes a perfect anchorage between the wet and dry layers. For best results the dry mixture should be applied in a thickness several times the thickness of the wet film applied by the sieve cylinder. The dry mixture represents several times the amount of the applied wet mixture. As a result an almost perfect hydration and total utility value of all cement in dry mixture is had, producing a stronger and superior product.

The superimposed layers then travel to the accumulator roll 43. A predetermined number of rotations of this roll is made to provide the number of desired thicknesses in the finished product. The accumulator roll has a smooth surface and is mounted so that it can move away from the driver roll 17 as the thickness of the laminated material on the accumulator roll increases on each rotation. The driver roll, however, has corrugations on its surface which are substantially those of the finished product and of the same contour as the form scraper and smoothing roll 40. This, however, does not interfere with proper forming although a reversal of contour is made in the laminated product, since the material being formed is still plastic.

As best shown in Figure 3, the driver roll 17 is provided with the portions 31' and 32' corresponding to the portions 31 and 32 of the form scraper, but it will be observed that the cross section is now reversed. However, this is immaterial since the superimposed material is still in a plastic state and can be formed between the accumulator roll and drive roll. As shown the first layer 37, next to the accumulator roll 43, is superimposed above a dry layer 38 and a second wet layer 37', the belt 15 being deformed sufficiently to receive and support the superimposed materials between the belt and the accumulator roll 43. As additional layers are added to the accumulator roll the belt 15 is forced further and further into the depression 31' and 32' to completely fill this space when the finished laminated sheet or slab is completed on the accumulator roll. In order to have the first layer adjacent the accumulator roll lie flat against this roll, it may be desirable to stop the feeding of the dry material to the first portion of the wet material coming into contact with the accumulator roll for a length equal to one circumference of the accumulator roll, the feeding being started at that point which begins the second layer on the accumulator roll so that there is a wet layer, a dry layer and then a wet layer as shown in Figure 3, dry and wet layers resulting from the continuous feeding of the dry material until laminations of the desired number are obtained. It is of course obvious that this order need not be followed and that any order may be provided depending upon the laminations desired and by controlling the feeding operations from the hopper.

When the desired number of laminations have been built up the material is stripped from the accumulator roll and when laid out flat has a form somewhat similar to that shown in Figure 4. This material may then be cut lengthwise and transversely as indicated by dotted lines to the finished product shown in Figure 5. It is of course obvious that the machine felt as well as the hopper and form scraper could have any reasonable width to provide any reasonable number of sections, for example a section wide enough to form four sets of shingles instead of three. Various combinations of course could be made and various contours could be made depending on the shape of the scraper and the general characteristics it is desired to obtain.

In the same manner corrugated material could be obtained by forming the scraper of proper shape and by forming the contour of the smoothing roll and drive roller as desired. Various other applications suggest themselves by an inspection of applicant's invention.

Should it be desired to waterproof the finished product this may be done in next to the last layer or any number of intermediate layers desired by providing a second hopper for example, which can be operated to feed the waterproofing material to the last layer to be supplied, or the same hopper could be used. It is preferable to apply the waterproofing material to a dry layer thus preventing dilution. Also by applying to one layer, interference with the setting of the cement is avoided. Likewise, fungus resistant material can also be applied to one or more layers of the laminated product as it is being made.

In connection with the waterproofing agent, such as pulverized resin, sulphur or asphalt, the finished product may be exposed to a sufficient steam or heat temperature to flux or melt the waterproofing agent, if desired. This proposed process of incorporating waterproofing agent in the dry layer mixture located preferably following the outside surface of the material has the big advantage of using suitable material regardless of color without affecting the surface color or appearance of the finished product.

In the same manner in applying fungus-preventive the mineral salts, such as copper sulphate, iron sulphate, copper dust or any other of the many salts, may be incorporated in the dry mixture in the layer next to the outside face layer of the finished product.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. A laminated cementitious product of sheet form having surfaces on opposite sides thereof lying in planes and at an angle to each other and including a plurality of superimposed laminations comprising a hydrated layer of long fibers and a fine ground binder, said long fibers lying parallel to the surface of the layer and a coating of shorter fibers and a binder on said layer, the fibers of the coating extending into the hydrated layer, the coating being several times thicker than said layer and increasing in thickness transversely of the product.

2. A laminated cementitious product of sheet form including a plurality of superimposed laminations comprising a hydrated layer of long fibers and a fine ground binder, and a coating of shorter fibers and a binder, the fibers of the coating extending into the layer to bind said hydrated layer and coating, said coating being several times thicker than said hydrated layer and increasing in thickness transversely of the product.

3. A laminated cementitious product of sheet form including a plurality of superimposed laminations comprising a hydrated layer of long fibers and finely ground binder, and a coating of shorter fibers and a binder, the fibers of the coating extending into the hydrated layer.

4. A laminated cementitious product of sheet form including a plurality of superimposed laminations comprising a hydrated layer of long fibers and finely ground binder, and a coating of shorter fibers and a binder on said layer, said coating having a thickness increasing transversely of the product.

5. A laminated cementitious product of sheet form having plane surfaces lying in intersecting planes and including a plurality of superimposed laminations comprising a hydrated layer of long fibers and a fine ground binder, said long fibers lying parallel to the surface of the layer, and a coating of shorter fibers and a binder on said layer, said coating having gradually varying thicknesses transverse of the product, the fibers of the coating extending into the hydrated layer.

RAYMOND W. ADAMS.